（12） United States Patent
Jia et al.

(10) Patent No.: US 7,751,484 B2
(45) Date of Patent: Jul. 6, 2010

(54) METHOD FOR COMPOSITE VIDEO ARTIFACTS REDUCTION

(75) Inventors: Yunwei Jia, Milton (CA); Lowell L. Winger, Waterloo (CA)

(73) Assignee: LSI Corporation, Milpitas, CA (US)

( * ) Notice: Subject to any disclaimer, the term of this patent is extended or adjusted under 35 U.S.C. 154(b) by 1470 days.

(21) Appl. No.: 11/115,463

(22) Filed: Apr. 27, 2005

(65) Prior Publication Data

US 2006/0244868 A1 Nov. 2, 2006

(51) Int. Cl.
*H04N 7/64* (2006.01)
*H04N 7/68* (2006.01)
*H04N 7/36* (2006.01)

(52) U.S. Cl. .............................. 375/240.29; 375/240.27

(58) Field of Classification Search ............ 375/240.27, 375/240.29, 240.12–240.16
See application file for complete search history.

(56) References Cited

U.S. PATENT DOCUMENTS

| | | | | |
|---|---|---|---|---|
| 5,532,750 A * | 7/1996 | De Haan et al. | ............. | 348/452 |
| 5,793,435 A * | 8/1998 | Ward et al. | ................... | 348/448 |
| 6,037,986 A * | 3/2000 | Zhang et al. | ........... | 375/240.12 |
| 6,396,876 B1 * | 5/2002 | Babonneau et al. | .... | 375/240.29 |
| 6,542,196 B1 * | 4/2003 | Watkins | ...................... | 348/448 |
| 2002/0146071 A1 * | 10/2002 | Liu et al. | ............... | 375/240.16 |
| 2002/0154698 A1 * | 10/2002 | Youn et al. | ............. | 375/240.17 |
| 2006/0062304 A1 * | 3/2006 | Hsia | ...................... | 375/240.16 |

OTHER PUBLICATIONS

Terr, David. "Weighted Mean." From MathWorld—A Wolfram Web Resource, created by Eric W. Weisstein. http://mathworld.wolfram.com/WeightedMean.html.*
Matsushita Electric Industrial Co., Ltd., "Panasonic DVD System Operating Instructions", 2002.*
LSI Logic, Jia, Y., Winger, L., Linzer, E., "A Robust Inverse Telecine Algorithm", Oct. 21, 2003, Milpitas, CA.
C-Cube Microsystems, Liu, A., "E5 MCTF Design Document", Mar. 10, 2003, Milpitas, CA.
C-Cube Microsystems, Garrido, D., "C-Cube's E5 Noise Reduction", Jan. 4, 2000, Milpitas, CA.
LSI Logic, Kohn, L., "DSP for E4 E5 and E5.1", pp. 11-88, May 29, 2003, Milpitas, CA.

* cited by examiner

*Primary Examiner*—Mehrdad Dastouri
*Assistant Examiner*—David N Werner
(74) *Attorney, Agent, or Firm*—Christopher P. Mariorana, PC

(57) ABSTRACT

A method for composite noise filtering is disclosed. The method generally includes the steps of (A) generating a selection value in response to a stationary check identifying one of a plurality of blendings for a current item of a current field, (B) generating a filtered item in response to one of (i) a first of the blendings between the current item and a first previous item co-located in a first previous field having an opposite phase of composite artifacts from the current field and (ii) a second of the blendings between the current item and a first motion compensated item from the first previous field and (C) switching between the first blending and the second blending in response to the selection value.

20 Claims, 10 Drawing Sheets linfilt

$$linfilt(\{a_i\},\{c_i\}) = \max\left(0, \min\left(255, \sum_i a_i \cdot c_i\right)\right)$$

WHERE $c_i$ ARE FILTERING COEFFICIENTS AND $a_i$ ARE INPUT PIXELS.

adapfrate

$$adapfrate\ (in,\ temp,\ pred,\ offset,\ T1,\ T2)$$

$$= temp_j + \min\left(1, f\left(\sum_{k=j-1}^{j+1}|in_k - pred_k|\right) + offset\right) \cdot (in_j - temp_j)$$

$$\text{where } f\left(\sum_{k=j-1}^{j+1}|in_k - pred_k|\right) = \begin{cases} 0 & \text{if } \sum_{k=j-1}^{j+1}|in_k - pred_k| < T1 \\ \dfrac{\left(\sum_{k=j-1}^{j+1}|in_k - pred_k|\right) - T1}{T2 - T1} & \text{else if } \sum_{k=j-1}^{j+1}|in_k - pred_k| < T2 \\ 1 & \text{otherwise} \end{cases}$$

*offset* IS A FLOAT NUMBER IN [0,1]. T1 IS A NON-NEGATIVE INTEGER. T2-T1 IS LIMITED TO {1,2,4,8,16,32}. THIS INTERNAL CALCULATIONS OF THIS INSTRUCTION ARE SHOWN IN FIG. 2.

abserr

$$abserr(B_1, B_2) = \sum_{i,j}|B_1(i,j) - B_2(i,j)|$$

WHERE $B_1$ AND $B_2$ ARE TWO PIXEL BLOCKS.

FIG. 1

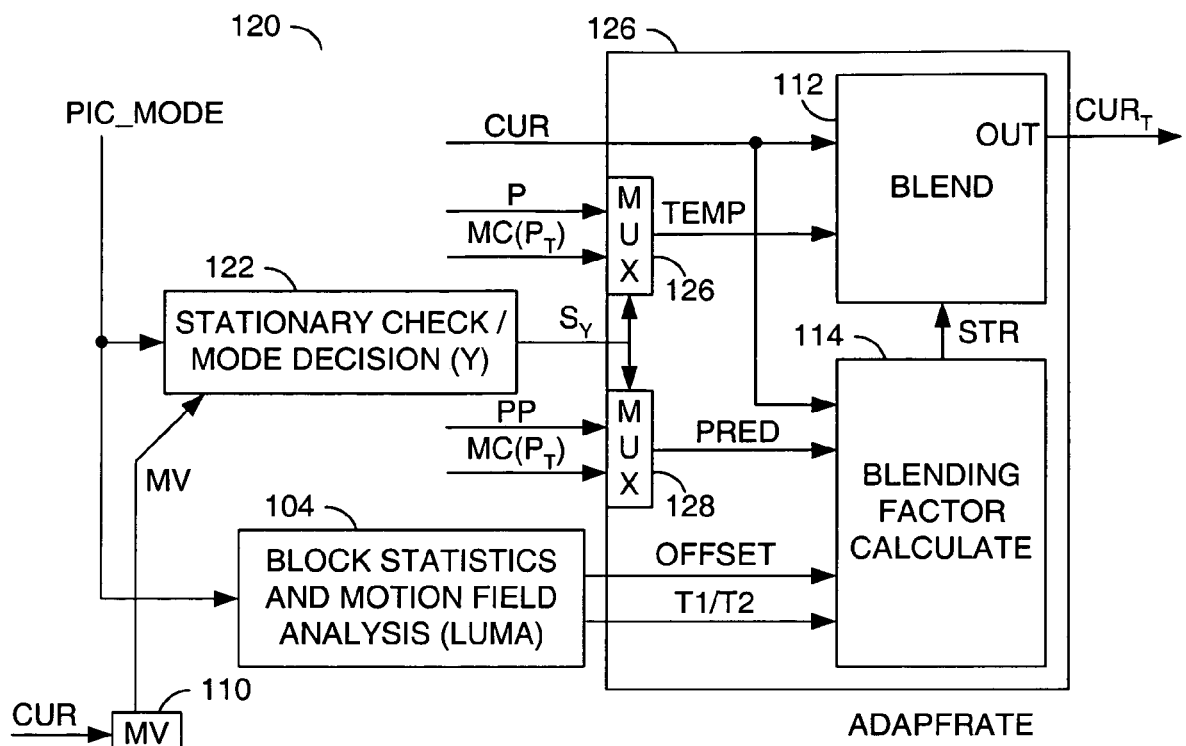
FIG. 3
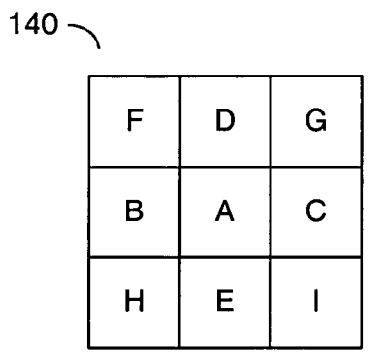
FIG. 4
ka = (MV$_x$(A) ≤ ZMV_TH  &&  MV$_y$(A) ≤ ZMV_TH)
kb = (MV$_x$(B) ≤ ZMV_TH  &&  MV$_y$(B) ≤ ZMV_TH)
kc = (MV$_x$(C) ≤ ZMV_TH  &&  MV$_y$(C) ≤ ZMV_TH)
kd = (MV$_x$(D) ≤ ZMV_TH  &&  MV$_y$(D) ≤ ZMV_TH)
ke = (MV$_x$(E) ≤ ZMV_TH  &&  MV$_y$(E) ≤ ZMV_TH)
IF ( (ka == 1) && (kb + kc + kd + ke ≥ ZMV_NC) )    s = 0
ELSE                                                 s = 1
FIG. 5

```
IF (s_C == 0)  // PIC_MODE == Still_Picture, OR Stationary_Area
{
        IF              SAD(Z_UV) > (C_StrFlt/8) * SAD(Z) for all Z in {A, B, C, D, E}
                &&      SAD(A) ≤ ACT(A)/4 + Bias_Toward_Strong_Flt
        {
                T1 = 255,  T2 = 287;     // DeltaT = 5
                offset = 0.5
        }
        ELSE
        {
                T1 = 8,    T2 = 40;      // DeltaT = 5
                IF         SAD(A)≤ACT(A)/2+Bias_Toward_Blend         OFFSET = Adaptive_Offset_3
                ELSE IF    SAD(A)≤3*ACT(A)/4+Bias_Toward_Blend       OFFSET = Adaptive_Offset_4
                ELSE                                                 OFFSET = Adaptive_Offset_5
        }
}
ELSE // PIC_MODE == MCTF_Only OR Moving_Picture, OR Moving_Object
{
        kb = (|MV_x(A)-MV_x(B)| < Pixel_Threshold_HP) && (|MV_y(A)-MV_y(B)| < Pixel_Threshold_HP)
        kc = (|MV_x(A)-MV_x(C)| < Pixel_Threshold_HP) && (|MV_y(A)-MV_y(C)| < Pixel_Threshold_HP)
        kd = (|MV_x(A)-MV_x(D)| < Pixel_Threshold_HP) && (|MV_y(A)-MV_y(D)| < Pixel_Threshold_HP)
        ke = (|MV_x(A)-MV_x(E)| < Pixel_Threshold_HP) && (|MV_y(A)-MV_y(E)| < Pixel_Threshold_HP)

IF (PIC_MODE == MCTF_Only)
        {
            T1 = 2,   T2 = 34;       // DeltaT = 5
            OFFSET = 1.0  // DEFAULT VALUE
            IF (kb + kc + kd + ke ≥ BLOCK_SIMILARITY_THRESHOLD)
            {
                    IF         SAD(A)≤ACT(A)/4+Bias_Toward_Blend       OFFSET = Adaptive_Offset_0
                    ELSE IF    SAD(A)≤ACT(A)/2+Bias_Toward_Blend       OFFSET = Adaptive_Offset_1
                    ELSE IF    SAD(A)≤3*ACT(A)/4+Bias_Toward_Blend     OFFSET = Adaptive_Offset_2
            }
        }
        ELSE
        {
            IF      (kb + kc + kd + ke ≥ BLOCK_SIMILARITY_THRESHOLD)
                 && SAD(Z_UV) > (C_StrFlt/8) * SAD(Z) for all Z in {A, B, C, D, E}
                 && SAD(A) ≤ ACT(A)/4 + Bias_Toward_Strong_Flt   // STRONG FILTERING
                    {
                            T1 = 32,   T2 = 64;      // DeltaT = 5
                            OFFSET = Adaptive_Offset_0
                    }
            ELSE    // WEAK FILTERING
                    {
                        T1 = 8,   T2 = 40; // DeltaT = 5
                        IF         SAD(A)≤ACT(A)/2+Bias_Toward_Blend    OFFSET = Adaptive_Offset_1
                        ELSE IF    SAD(A)≤3*ACT(A)/4+Bias_Toward_Blend  OFFSET = Adaptive_Offset_2
                        ELSE                                            OFFSET = 1.0
                    }
        }
}
```

FIG. 6

```
IF (s_Y == 0) // PIC_MODE == Still_Picture, OR Stationary_Area, STRONG XLuma EVIDENCE
{
        T1 = 16, T2= 48;    // DeltaT = 5
        sad = abserr (A in Fn, A in Fn-4) // WITH (0,0) MOTION
        OFFSET = 0.5;
}
ELSE // PIC_MODE == Moving_Picture, OR MCTF_Only, OR Moving_Object
{
        T1 = 2,  T2= 34; // DeltaT = 5
        sad = SAD(A)

kb =           (|MV_x(A)-MV_x(B)|< Pixel_Threshold_HP)
               &&      (|MV_y(A)-MV_y(B)|< Pixel_Threshold_HP)
        kc =           (|MV_x(A)-MV_x(C)|< Pixel_Threshold_HP)
               &&      (|MV_y(A)-MV_y(C)|< Pixel_Threshold_HP)
        kd =           (|MV_x(A)-MV_x(D)|< Pixel_Threshold_HP)
               &&      (|MV_y(A)-MV_y(D)|< Pixel_Threshold_HP)
        ke =           (|MV_x(A)-MV_x(E)|< Pixel_Threshold_HP)
               &&      (|MV_y(A)-MV_y(E)|< Pixel_Threshold_HP)

OFFSET = 1.0; // DEFAULT VALUE
        IF (kb + kc + kd + ke ≥ BLOCK_SIMILARITY_THRESHOLD)
        {
                IF SAD ≤ ACT(A)/4+Bias_Toward_Blend
                        OFFSET=Adaptive_Offset_0
                ELSE IF  SAD ≤ ACT(A)/2+Bias_Toward_Blend
                        OFFSET=Adaptive_Offset_1
                ELSE IF  SAD ≤ 3*ACT(A)/4+Bias_Toward_Blend
                        OFFSET=Adaptive_Offset_2
        }
}
```

FIG. 7

```
IF Block_Flt_Mode == BiDir_Replacement    // FULL REPLACEMENT
        Flt_C(A) = ( FwdMC_C(A) + BwdMC_C(A) ) / 2
ELSE IF Block_Flt_Mode == BiDir     // BLENDING WITH ORIGINAL
        Flt_C(A) = ( A + (FwdMC_C(A) + BwdMC_C(A) ) / 2) /2
ELSE IF Block_Flt_Mode = Fwd  // BLENDING WITH ORIGINAL
        Flt_C(A) = ( A + FwdMC_C(A) ) / 2
ELSE IF Block_Flt_Mode = Bwd  // BLENDING WITH ORIGINAL
        Flt_C(A) = ( A + BwdMC_C(A) ) / 2
ELSE // Block_Flt_Mode = NoFiltering    // USE ORIGINAL
        Flt_C(A) = A
```

FIG. 14

| SYMBOL | MEANING | RANGE | DEFAULT VALUE | OTHER USEFUL VALUES |
|---|---|---|---|---|
| ME2_search_range_x ME2_search_range_y | SEARCH RANGE OF ME2 | | 4 2 | |
| ME3_search_range_x ME3_search_range_y | SEARCH RANGE OF ME3 | | 3 3 | |
| ME2_zero_bias | BIAS TO (0,0) | | 16 | 0 |
| ME3_zero_bias | BIAS TO SEARCH CENTER | | 16 | 0 |
| Zero_bias | BIAS IN ZERO MOTION CHECK | | 256 | 1024 |
| Bias_Toward_Blend | BIAS TOWARD BLENDING | 0 ~ 255 | 128 | 0, 255 |
| Adaptive_Offset_0 Adaptive_Offset_1 Adaptive_Offset_2 | FILTERING OFFSETS FOR ADAPFRATE | 0.0 ~ 1.0 | 0.2 0.3 0.4 | 0, 0 FOR STRONG FILTERING |
| Pixel_Threshold_HP | MOTION VECTOR DIFFERENCE THRESHOLD | 0 ~ 7 ½ PEL | 3 | 0, 1, 2 |
| BLOCK_SIMILARITY _THRESHOLD | CONSISTENT MOTION NEIGHBOR COUNT FOR MOVING OBJECTS | 0 ~ 4 INTEGER | 3 | 0, 1, 2, 4 |
| PIC_MODE | PICTURE LEVEL MODE | MCTF_Only Still_Picture Moving_Picture VF_Chroma_Only Block_Level_ Stationary_Check | Block_Level _Stationary _Check | |
| Bias_Toward_Strong_Flt | BIAS TOWARD STRONG FILTERING | -128 ~ +128 | 0 | -128, +128 |
| C_StrFlt | COEFFICIENT FOR STRONG FILTERING CHECK | 1 ~ 32 INTEGER | 16 | 8, 12, 24 |
| Adaptive_Offset_3 Adaptive_Offset_4 Adaptive_Offset_5 | FILTERING OFFSETS FOR ADAPFRATE, STATIONARY AREAS | 0.5 ~ 1.0 | 0.53 0.56 0.75 | ANY VALUES IN 0.5 ~ 1.0 |
| ZMV_NC | ZERO - MOTION NEIGHBOR COUNT FOR STATIONARY CHECK | 0 ~ 4 INTEGER | 4 | 3, 2, 1, 0 |
| ZMV_TH | MOTION VECTOR THRESHOLD FOR STATIONARY CHECK | {0, 1, 2}  ½ PEL | 0 | 1, 2 |
| RMV_TH1 RMV_TH2 | RANDOM MOTION VECTOR THRESHOLDS | {2,3,4,5} | 4 3 | 2, 3, 5 |
| VF_STR | STRENGTH OF VERTICAL FILTER | 0.0 ~ 0.5 | 0.25 | 0.33, 0.20, 0.125, 0 |

FIG. 8

```
ACT_O = predact (Orig, constant)      // ACT OF Orig
ACT_P = predact (Orig, PrevMc)        // ACT OF Orig-PrevMc
ACT_N = predact (Orig, NextMc)        // ACT OF Orig-NextMc
ACT_Av = avgpredact (NextMc, PrevMc, Orig)
                                       // ACT OF (NextMc+PrevMc)/2-Orig
Minactmc = min(Act_N, Act_P)

IF (Act_O <= Minactmc+100)        Filt = Orig
ELSE IF (Act_Av <= Minactmc-200)  Filt = (Orig+AvMC)/2
ELSE IF (Act_N == Minactmc)       Filt = (Orig+NextMC)/2
ELSE                              Filt = (Orig+PrevMC)/2
```

FIG. 9

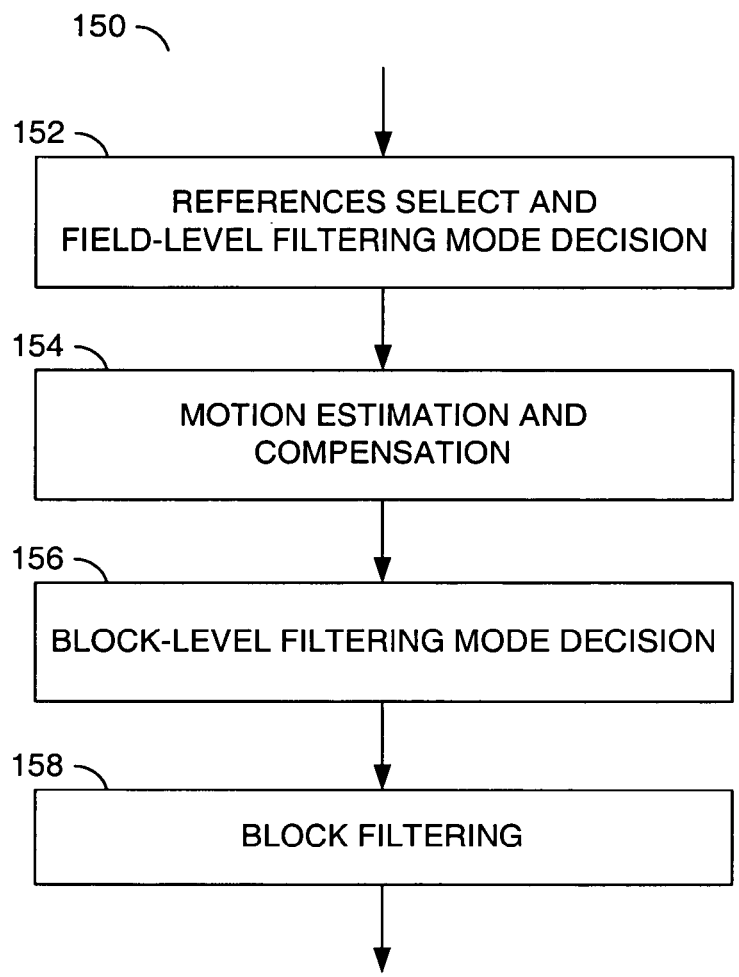

FIG. 10

```
        FwdRef = Fn-2,    BwdRef = Fn+2    // DEFAULT
IF Fn IS A FIELD IN A STILL PICTURE
        Field_Flt_Mode = BiDir
ELSE IF THERE IS A SCENE CHANGE IN THE RANGE OF FB
        Field_Flt_Mode = Open    // TO BE DECIDED AT BLOCK LEVEL
ELSE IF THERE IS NO REPEATED PAIR IN THE RANGE OF FB,
        Field_Flt_Mode = Open
ELSE IF (Fn-2, Fn) IS A REPEATED PAIR,
        Field_Flt_Mode = Fwd
ELSE IF (Fn, Fn+2) IS A REPEATED PAIR,
        Field_Flt_Mode = Bwd
ELSE
        LET (Fk-2, Fk) BE THE REPEATED PAIR IN FB WHICH IS CLOSEST
TO Fn
        Field_Flt_Mode = BiDir_Replacement
        FwdRef = Fk-2, BwdRef = Fk
        SET THE BwdMV TO BE THE SAME AS FwdMV AFTER FORWARD ME
```

NOTE 1: THE REFERENCES SELECTED AS ABOVE SHOULD BE USED FOR BOTH ME AND MCTF.

NOTE 2: IN THE LAST CASE WHERE (Fk-2, Fk) IS THE REPEATED PAIR IN FB WHICH IS CLOSEST TO Fn, IT IS NECESSARY TO SET THE BACKWARD MOTION VECTORS TO BE THE SAME AS THE FORWARD MOTION VECTORS, SINCE OTHERWISE DIFFERENT FORWARD AND BACKWARD MOTION VECTORS CAUSED BY NOISE MAY INTRODUCE NEW CHROMA ARTIFACTS WHEN THE CURRENT CHROMA IS REPLACED BY THE AVERAGE OF FwdMC_Chroma AND BwdMC_Chroma.

FIG. 12

```
IF Field_Flt_Mode == BiDir_Replacement
    IF   Ref_SAD > c3 * Block_Size              // NOTE 1
      && FwdSAD < IntraACT_Y(A)/2 + 64          // NOTE 2
      && BwdSAD < IntraACT_Y(A)/2 + 64
        Block_Flt_Mode = BiDir_Replacement
    ELSE
        Block_Flt_Mode = Open
ELSE IF  Field_Flt_Mode == BiDir
    IF  Fwd_NC + Bwd_NC >= 6
      && FwdSAD < IntraACT_Y(A)/2 + 128
      && BwdSAD < IntraACT_Y(A)/2 + 128
        Block_Flt_Mode = BiDir
    ELSE
        Block_Flt_Mode = Open
ELSE IF Field_Flt_Mode == Fwd
    IF  Fwd_NC>=4 && FwdSAD<IntraACT_Y(A)/2+128  // NOTE 3
        Block_Flt_Mode = Fwd,
    ELSE
        Block_Flt_Mode = Open
ELSE IF  Field_Flt_Mode == Bwd
    IF  Bwd_NC >= 4 && BwdSAD < IntraACT_Y(A)/2+128)
        Block_Flt_Mode = Bwd,
    ELSE
        Block_Flt_Mode = Open
ELSE // Field_Flt_Mode = Open
    Block_Flt_Mode = Open IF Block_Flt_Mode == Open
Act0 = IntraACT_C(A)
Act1 = IntraACT_C( (A + FwdMC_C(A))/2 )
Act2 = IntraACT_C( (A + BwdMC_C(A))/2 )
Act3 = IntraACT_C( ( A + (FwdMC_C(A)+BwdMC_C(A)) / 2  ) / 2)
Fwd_Valid = (FwdSAD<Sad_Thr) && (FwdSAD<BwdSAD)
            && (Act1 < Act0-100)   // NOTE 4
Bwd_Valid = (BwdSAD<Sad_Thr) && (BwdSAD<FwdSAD)
            && (Act2 < Act0-100)
BiDir_Valid = (FwdSAD+BwdSAD<4*Sad_Thr) && (Ref_SAD<Ch_Thr)
            && (Act3<=Act1) && (Act3<=Act2) && (Act3<=Act0-100) // NOTE 5
IF BiDir_Valid
    Block_Flt_Mode = BiDir
ELSE IF Fwd_Valid
    Block_Flt_Mode = Fwd
ELSE IF Bwd_Valid
    Block_Flt_Mode = Bwd
ELSE
    Block_Flt_Mode = NoFiltering
```

FIG. 13

NOTE 1: c3 IS A PROGRAMMABLE PARAMETER WITH DEFAULT VALUE 8. THE CONDITION IS TO ENSURE THE EXISTENCE OF REVERSING CHROMA NOISE IN FORWARD REFERENCE AND BACKWARD REFERENCE.
NOTE 2: THE CONDITION IS TO ENSURE GOOD MOTION MATCH, CONSIDERING ALSO INTRA ACTIVITY OF A BLOCK.
NOTE 3: MOTION CONSISTENCY IS ALSO CONSIDERED TO ENSURE GOOD MOTION MATCH.
NOTE 4: Sad_Thr IS A PROGRAMMABLE THRESHOLD WITH DEFAULT VALUE 64.
NOTE 5: C_Thr IS A PROGRAMMABLE THRESHOLD WITH DEFAULT VALUE 64.

METHOD FOR COMPOSITE VIDEO ARTIFACTS REDUCTION

FIELD OF THE INVENTION

The present invention relates to a video processing generally and, more particularly, to a method for composite video artifacts reduction.

BACKGROUND OF THE INVENTION

In composite video systems such as NTSC and PAL, color information is transmitted by a color sub-carrier superimposed on a luminance signal. Commonly the luminance signal and the chrominance signal actually share some frequency bands. As a result, two types of artifacts are seen in composite video: cross-chroma and cross-luma. Cross-chroma results when the luminance signal contains frequency components near the color sub-carrier frequency, and spurious colors are generated in the picture (sometimes also called "bleeding" or "rainbow effects"). Cross-luma occurs around the edges of highly saturated colors as a continuous series of crawling dots (sometimes also called "dot crawl"), and is a result of color information being confused with luminance information. Cross-luma artifacts are mainly noticeable and annoying to viewers in stationary areas, and vertical cross-luma artifacts are more commonly seen than horizontal ones.

On stationary video, chroma artifacts that occur in decoded composite video oscillate from frame-to-frame (i.e., from a current field to a next same-parity field having an opposite composite artifact phase) between two values, the mean of which is an artifact-free chroma value. Observing a moving zone-plate when an object is moving, the composite artifacts that appear on the object do not perfectly reverse themselves between successive frames in NTSC video and every second frame in PAL video (as they do on stationary objects). However, for moving objects with constant translational velocity the relationship is nearly true.

A special case of the above observation occurs in telecined sequences. In a telecine sequence, a repeated pair of fields (i.e., two consecutive same parity fields that repeat each other) occurs in every five fields, given that a regular 3:2 pull-down is used in the telecine process. The chroma artifacts in the repeated pair of fields oscillate between two values, and the mean of which is an artifact-free chroma value for both fields.

SUMMARY OF THE INVENTION

The present invention concerns a method for composite noise filtering. The method generally comprises the steps of (A) generating a selection value in response to a stationary check identifying one of a plurality of blendings for a current item of a current field, (B) generating a filtered item in response to one of (i) a first of the blendings between the current item and a first previous item co-located in a first previous field having an opposite phase of composite artifacts from the current field and (ii) a second of the blendings between the current item and a first motion compensated item from the first previous field and (C) switching between the first blending and the second blending in response to the selection value.

The objects, features and advantages of the present invention include providing a method and/or system for composite video artifacts reduction that may (i) reduce chrominance artifact noise, (ii) reduce luminance artifact noise, (iii) switch between filtering techniques based on a stationary check, (iv) operate quickly after a scene change and/or (v) remove noise associated with moving objects in the fields.

BRIEF DESCRIPTION OF THE DRAWINGS

These and other objects, features and advantages of the present invention will be apparent from the following detailed description and the appended claims and drawings in which:

FIG. 1 is a set of functions;
FIG. 3 is a block diagram of an example implementation of a second system in accordance with a preferred embodiment of the present invention;
FIG. 4 is a block diagram of a neighborhood proximate a current block;
FIG. 5 is a listing of a set or rules;
FIG. 6 is a listing of a first example code for calculating T1, T2, and OFFSET;
FIG. 7 is a listing of a second example code for calculating T1, T2 and OFFSET;
FIG. 8 is a listing of example programmable parameters;
FIG. 9 is a listing of an example code for a method A;
FIG. 10 is a flow diagram of an example implementation for a method C;
FIG. 12 is a listing of a set of rules for determining a forward reference, a backward reference and a field-level filtering mode;
FIG. 13 is a listing of a set of filtering mode rules;
and
FIG. 14 is a listing of an example implementation of code for filtering a block.

DETAILED DESCRIPTION OF THE PREFERRED EMBODIMENTS

Figure 2:
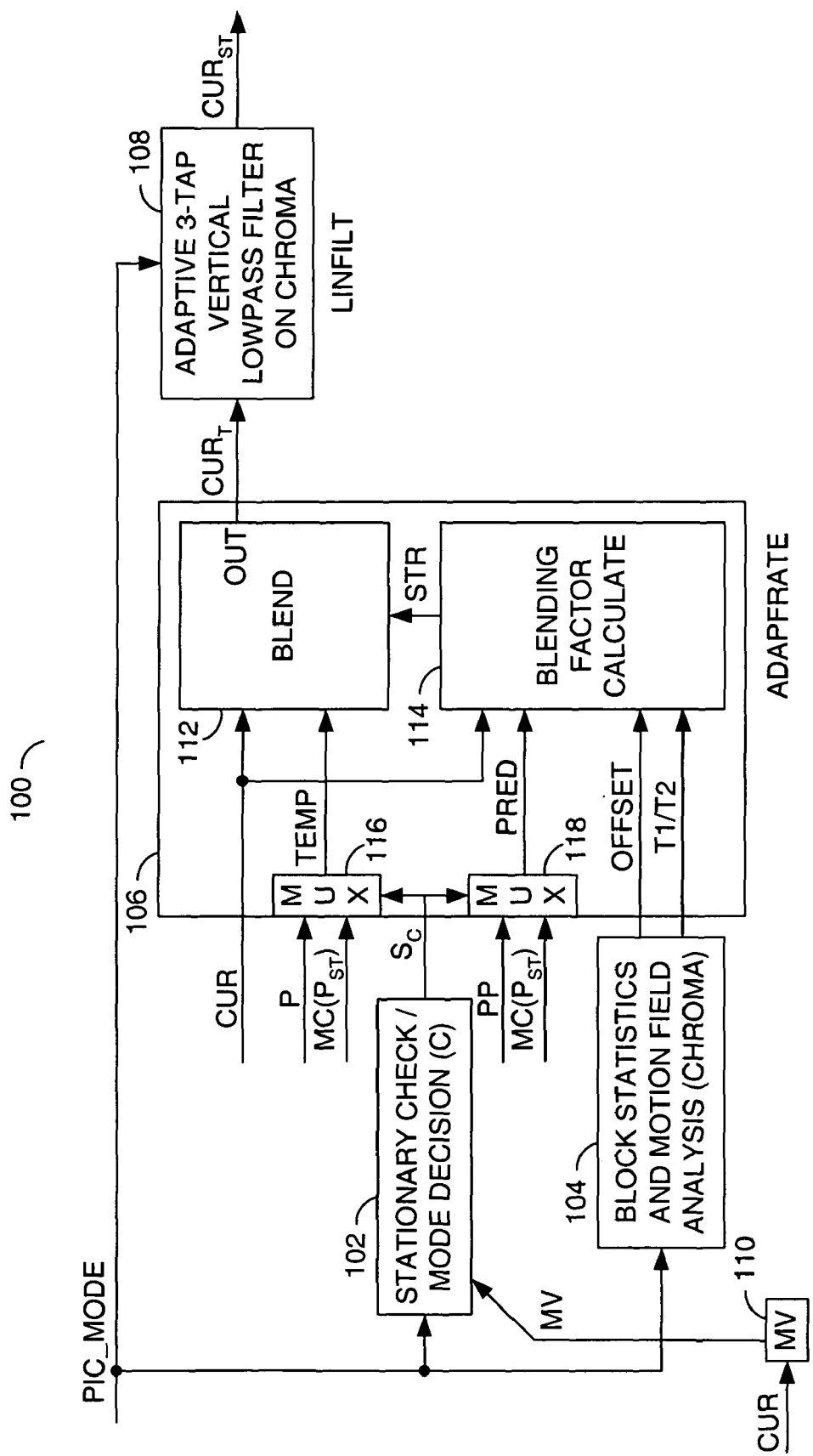
FIG. 2 is a block diagram of an example implementation of a first system in accordance with a preferred embodiment of the present invention.

The present invention generally concerns a method and/or system for the reduction of both cross-chroma and cross-luma types of composite artifacts. For cross-chroma reduction, the following three observations may be applicable: (1) Cross-chroma artifacts that appear in stationary objects in a sequence generally oscillate from a field to a next same-parity field between two values, the mean of which may be an artifact-free chrominance value. (2) In general, the observation (1) does not perfectly hold for cross-chroma artifacts that appear in moving objects in a sequence. However, for moving objects with a constant translational velocity, the observation (1) may be nearly true. (3) Cross-chroma artifacts generally contain (i) relatively stronger high spatial frequency components than most artifact free video contents and (ii) more vertical high frequency components than horizontal high frequency components.

Based on the above observations, a general approach to cross-chroma reduction may proceed as follows. For stationary areas in a field, noise reduction may include averaging chrominance signals with similar signals in a preceding same-parity field. For moving objects with a constant translational velocity, noise reduction generally includes blending chrominance signals in the current field with similar signals of a motion compensated preceding same-parity field. For moving objects, noise reduction may include spatially filtering the chrominance signals.

For stationary areas with vertical cross-luma artifacts, the following two observations may be applicable: (1) The cross-luma artifacts generally oscillate from a current field to a next same-parity field between two values, the mean of which is generally an artifact-free luminance value. (2) Motion vectors in a local neighborhood proximate the composite noise tend to have zero horizontal components and randomly distributed vertical components. The vertical components generally have dimensions of 0 pel, ±1 pel, ±3 pels, ±5 pels, ±7 pels and so on. Observations of the motion vectors may be used to distinguish stationary areas with cross-luma artifacts from vertically moving areas.

Based on the above two observations, cross-luma artifacts may be reduced by first detecting stationary areas with cross-luma artifacts and then, for the detected stationary areas, averaging the luminance signals of the current field with the luminance signals in the preceding same-parity field (e.g., every other field for NTSC video and every fourth field for PAL video). Therefore, a significant improvement in composite artifact removal, compared with conventional approaches, may be achieved on stationary (or nearly stationary) portions of video with a simple averaging. Additional artifact reduction may be achieved on purely translational portions of video with motion compensated filtering.

In practice, exact stationary and/or exact translations are generally sub-cases that may rarely perfectly true. Therefore, threshold blending may be implemented to control the amount of blending and/or averaging that may be done with both block and pixel level decisions. The block and/or picture level controls may include several variables (e.g., T1, T2, deltaT=T2−T1 and OFFSET). The variables may be set based upon statistics which serve to judge how well the block matches a model for an exact stationarity or an exact linear translation. The block level controls generally determine how much filtering/averaging/blending is to be permitted. Similarly, a pixel-level control (e.g., a function 'f ( )' in FIG. 1) may determine how much filtering/averaging/blending is to be permitted on a pixel basis. For example, the amount of change that is to be permitted to occur in the current pixel is determined based upon the activity of a local neighborhood of pixels compared between two fields.

In a telecine sequence, a repeated pair of fields (e.g., two consecutive same parity fields that repeat each other) generally occur in every five fields, given that a regular 3:2 pulldown is used in the telecine process. The chroma artifacts in the repeated pair of fields may oscillate between two values, the mean of which is generally an artifact-free chroma value for both fields. For a non-repeated field, if good motion matches may be found from the current field to each of the two fields in a repeated pair, then the average of the two motion-compensated chroma samples is generally the artifact-free chroma value for the current field.

The following terminology may be employed for both signal names and value carried by the signals.

Fn: a current field to be filtered.
Fn−2: a previous same-parity field of Fn having inverse phase composite artifacts.
Fn−4: a previous same-parity field of Fn having inverse phase composite artifacts.
CUR: current item to be filtered in the field Fn.
P: co-located previous item of CUR in the field Fn−2.
PP: co-located second previous (pre-previous) item of CUR in the field Fn−4.
PPPP: co-located fourth previous item of CUR in the field Fn−4.
CUR$_T$: temporally filtered CUR.
CUR$_{ST}$: spatially and temporally filtered CUR (e.g., final output).
MC(P$_{ST}$): motion compensated CUR from spatially and temporally filtered previous item in the field Fn−2.
MC(P$_T$): motion compensated CUR from a temporally filtered previous item in the field Fn−2.
OFFSET: blending factor offset for CUR.
T1: first blending threshold for CUR.
T2: second blending threshold for CUR.
Sy: select between strong luma filtering (e.g., Sy=0) and normal luma filtering.
Sc: select between strong chroma filtering (e.g., Sc=0) and normal luma filtering (e.g., Sc=1).
MV: motion vector for a neighborhood around and including CUR.
PrevMc: previous same-parity motion compensated item.
NextMc: next same-parity motion compensated field.
Filt: filtered field.
Orig: original unfiltered field.
MC(Fk): motion compensated field of field Fk, where k=s indicates spatial compensation, k=t indicates temporal compensation and k=st indicates both spatial and temporal compensation.
MC_Y(Fk): luma of MC(Fk).
MC_C(Fk): chroma of MC(Fk).
SAD(A, B): sum of absolute differences between two fields or two blocks.
Nfilt: a filtered version of a field N.

The items (e.g., CUR, CUR$_T$, CUR$_{ST}$ P, PP, PPPP and MC(P$_{ST}$)) may be represent a pixel, block, field or frame.

Referring to FIG. 1, a set of functions are illustrated. The functions "linfilt" (linear filter), "adapfrate" (adaptive frame rate) and "abserr" (accumulated absolute difference) generally define video digital signal processing instructions suitable for implementing the present invention. Details of the functions may be found in a document "DSP for E4, E5 and E6", by L. Kohn, May 2003, Milpitas, Calif., which is hereby incorporated by reference in its entirety.

Referring to FIG. 2, a block diagram of an example implementation of a system 100 is shown in accordance with a preferred embodiment of the present invention. The system (or circuit) generally comprises a circuit (or module) 102, a circuit (or module) 104, a circuit (or module) 106, a circuit (or module) 108 and a circuit (or module) 110. The system 100 may be suitable for filtering cross-chroma artifact noise generated in a composite video signal.

A signal (e.g., PIC_MODE) may be received by the circuits 102, 104 and 108. The circuit 102 may receive a signal (e.g., MV) may be presented from the circuit 110. A signal (e.g., Sc) may be presented from the circuit 102 to the circuit 106. Signals (e.g., OFFSET, T1 and T2) may be presented from the circuit 104 to the circuit 106. A signal (e.g., CUR$_T$) may be presented from the circuit 106 to the circuit 108. A signal (e.g., CUR$_{ST}$) may be presented from the circuit 108. The circuit 106 may also receive the signal CUR, the signal P, a signal (e.g., MC(P$_{ST}$)) and a signal (e.g., PP).

The circuit 102 may be referred to as a check circuit. The check circuit 102 may be operational to perform a stationary check on a current item in the signal CUR and present the signal Sc in response to the stationary check. If the current item is stationary, the signal Sc may have a first (e.g., stationary) state. If the current item is moving, the signal Sc may have a second (e.g., moving) state.

The circuit 104 may be referred to as an analysis circuit. The analysis circuit 104 may be operational to perform a block statistic and/or motion field analysis on the current item. Further details of the analysis circuit 104, the signal OFFSET and the signals T1 and T2 may be found in a document, "C-Cube's E5 Noise Reduction", by D. Garrido, January 2000, Milpitas, Calif., which is hereby incorporated by reference in its entirety.

The circuit 106 may be referred to as a filter circuit or a blend circuit. The blend circuit 106 may be operational to temporally filter artifact noise from the current item. The blend circuit 106 may switch between different modes of filtering based on the signal Sc.

The circuit 108 may be referred to as a lowpass filter circuit. The lowpass filter circuit 108 may be operational to perform a spatial filtering of the temporal filtered current item. The lowpass filter circuit 108 may be implemented as a 3-tap vertical lowpass filter with the tap values determined based on the signal MODE.

The circuit 110 may be referred to as a motion estimation (ME) circuit. The ME circuit 110 may be operational to determined one or more motion vectors in a local neighborhood around and including the current item. The ME circuit 110 may be included in encoder systems and/or in decoder systems implementing the present invention.

The filter circuit 106 generally comprises a circuit (or module) 112, a circuit (or module) 114, a multiplexer (or module) 116 and a multiplexer (or module) 118. The circuit 112 may receive the signal CUR, a signal (e.g., TEMP) and a signal (e.g., STR).

The circuit 112 may present the signal CUR$_T$ to the lowpass filter circuit 110. The circuit 114 may receive the signal CUR, a signal (e.g., PRED), the signal OFFSET and the signal T1/T2. The multiplexer 116 may receive the signal P, the signal MC(P$_{ST}$) and the signal Sc. The multiplexer 116 may present the signal TEMP to the circuit 112 based on the signal Sc. The multiplexer 118 may receive the signal PP, the signal MC(P$_{ST}$) and the signal Sc. The multiplexer 118 may presented the signal PRED to the circuit 114 based on the signal Sc. The circuit 114 may present the signal STR to the circuit 112.

The circuit 112 may be referred to as a blend circuit. The blend circuit 112 may be operational to blend the signal CUR with the signal TEMP based on the strength signal STR. The signal TEMP may be one of the signals P or MC(P$_{ST}$) as determined by the select signal Sc.

The circuit 114 may be referred to as a blend factor calculate circuit, or calculate circuit for short. The calculate circuit 114 may be operational to generate the strength signal STR based on the signals CUR (also referred to as a signal IN in FIG. 1), PRED, OFFSET, T1 and T2. The signal PRED may be one of the signals PP or MC(P$_{ST}$) based on the select signal Sc.

Referring to FIG. 3, a block diagram of an example implementation of a system 120 is show in accordance with a preferred embodiment of the present invention. The system (or circuit) 120 generally comprises a circuit (or module) 122, the analysis circuit, a circuit (or module) 126 and the ME circuit 110. The system 120 may be suitable for filtering cross-luma artifact noise generated in a composite video signal.

The signal PIC_MODE may be received by the circuits 122 and 104. The circuit 112 may receive the motion vector signal MV from the ME circuit 110. The signal Sc may be presented from the circuit 122 to the circuit 126. The signals OFFSET, T1 and T2 may be presented from the circuit 104 to the circuit 126. The signal CUR$_T$ may be presented from the circuit 126. The circuit 126 may also receive the signal CUR, the signal P, the signal PP and a signal (e.g, MC(P$_T$)).

The circuit 122 may be referred to as a check circuit. The check circuit 122 may be operational to perform a stationary check on a current item in the signal CUR and present the signal Sy in response to the stationary check. If the current item is stationary, the signal Sy may have a first (e.g., stationary) state. If the current item is moving, the signal Sy may have a second (e.g., moving) state.

The circuit 126 may be referred to as a filter circuit or a blend circuit. The blend circuit 126 may be operational to temporally filter artifact noise from the current item. The blend circuit 126 may switch between different modes of filtering based on the signal Sy.

The circuit 126 generally comprises the blend circuit 112, the calculate circuit 114, a multiplexer (or module) 126 and a multiplexer (or module) 128. The multiplexer 126 may generate the signal TEMP as one of the signals P or MC(P$_T$) based on the select signal Sy. The multiplexer 128 may generate the signal PRED as one of the signals PP or MC(P$_T$) based on the select signal Sy.

Note that all the above symbols (e.g., signal names and/or signal values), except PIC_MODE, Sy, and Sc may have different meanings and/or values for the systems 100 and 120. For example, CUR generally represents the chrominance components to be filtered in the field Fn by the system 100. However, CUR generally represents the luminance components to be filtered in the field Fn by the system 120. The signals Sc and Sy may be generically referred to as a select signal S.

At a picture level, the signal PIC_MODE generally controls the behavior of the filtering process by commanding one of the following five modes (or states):

(1) MCTF_Only (e.g., S=1): the process generally performs motion compensation temporal filtering. The lowpass filter circuit 108 may be disabled in the MCTF_Only mode. In the MCTF_Only mode, only the current field Fn and the filtered field of Fn−2 may be used.

(2) VF_Chroma_Only: only the vertical filtering on chroma may be performed with no temporal filtering on either luminance or chrominance. The VF_Mode may be used for a first frame after a scene change. In the VF_Mode, only the current field Fn is generally used.

(3) Still_Picture: the select signals Sy and Sc may be forced to the zero state for all blocks in the current field Fn. The Still_Picture mode should be used when still pictures are detected. In the Still_Picture mode for chrominance processing, three original fields (e.g., Fn, Fn−2 and Fn−4) may be used. For luminance processing, the field Fn, the filtered field of Fn−2, and the filtered field of Fn−4 may be used.

(4) Moving_Picture: the select signals Sc and Sy may forced to the one state for all blocks in the field Fn. The Moving_Picture mode may be used for the second frame after a scene change. In the Moving_Picture mode for both chrominance processing and luminance processing, only the current field Fn and the filtered field of Fn−2 may be used.

(5) Block_Level_Stationary_Check: the select signals Sy and Sc may be determined at a block level. In the Block_Level_Stationary_Check mode for chrominance processing, the fields Fn, Fn−2 and Fn−4 may be used. For luminance processing, the field Fn, the filtered field of Fn−2 and the filtered field of Fn−4 may be used.

If PIC_MODE is Block_Level_Stationary_Check, the check circuits 102/122 generally analyze a motion field in the neighborhood of the current item to decide whether the current item either (i) belongs to a moving object or (ii) is located in a stationary area. The check circuit 102/122 may also determine the filtering mode as described later.

If PIC_MODE is not VF_Chroma_Only, the analysis circuit 104 may calculate values for T1, T2 and OFFSET by analyzing the statistics of the current item and the motion field in the neighborhood of the current item. The statistics used in the calculation generally include:

ME results of the current item;
intra activity of the current item;
a sum of absolute prediction residues on chrominance; and
an absolute error between the current item and a co-located block in the field Fn−4.

The ME results and the intra activity may be used for all cases, except PIC_MODE=VF_Chroma_Only. The sum of absolute prediction residues may be used for the cases except PIC_MODE=VF_Chroma_Only and PIC_MODE=MCTF_Only. The absolute error is generally used for PIC_MODE=Still_Picture and PIC_MODE=Block_Level_Stationary_Check.

The check circuits 102/122 may be operational to (i) determine whether the current item is located in a stationary area or belongs to a moving object, and (ii) determine a filtering mode.

The analysis circuit 104 (in the system 120 for luma) may be operational to determine the filtering parameters T1, T2, and OFFSET for luminance processing. The analysis circuit 104 (in the system 100 for chroma) may be operational to determine the filtering parameters T1, T2, and OFFSET for chrominance processing. Note that different statistics may be used in the different analysis circuits 104 in the different systems 100/120.

The video digital signal processing (VDSP) instruction "adapfrate" may perform temporal filtering on luminance and chrominance for the purpose of reducing random noise and composite noise. The temporal filtering may be implemented using the VDSP instruction adapfrate. The temporal filtering is generally bypassed in both chrominance processing and luminance processing if PIC_MODE is VF_Chroma_Only.

The lowpass filter circuit 110 is generally used when PIC_MODE is not MCTF_Only for the purpose of further reducing composite noise in the chrominance. The lowpass filter circuit 110 may be turned off for stationary areas with strong evidence. The lowpass filter circuit 110 be implemented using the VDSP instruction "linfilt".

Referring to FIG. 4, a block diagram of a neighborhood 140 proximate a current block is shown. The block level stationary check is generally used only when PIC_MODE is Block_Level_Stationary_Check. For each block, a select S (e.g., Sy or Sc) may be calculated to indicate whether the block is located in a stationary area (e.g., S=0) or belongs to a moving object (e.g., S=1). Let A be the current block to be filtered in the field Fn and eight neighboring blocks may be {B, C, . . . , I} as shown in FIG. 3.

Let [MVx(A), MVy(A)] be the motion vector of A with the filtered field Fn−2 being a reference field. Similar notations may be apply to other blocks as well. Among the nine blocks B-I, let $N_{-1}$, $N_{+1}$, $N_{-3}$, and $N_{+3}$ be the number of blocks with MVy of −1 pel, +1 pel, −3 pels, +3 pels, respectively, and the block A counted twice. For example, if among the nine blocks, only A, F, and I may have MVy of −1, then $N_{-1}$=4.

Set MVy(A) to 0 if all of the following three conditions are generally satisfied:

$$MVx(Z)=0 \text{ pel and } Mvy(Z) \in \{0 \text{ pel}, \pm 1 \text{ pel}, \pm 3 \text{ pels}\}$$
$$\text{for } Z \in \{A, B, C, \ldots, I\}. \quad (1)$$

$$N_{-1} \leq RMV\_TH1 \text{ \&\& } N_{+1} \leq RMV\_TH1 \quad (2)$$

$$N_{-3} \leq RMV\_TH2 \text{ \&\& } N_{+3} \leq RMV\_TH2 \quad (3)$$

where RMV_TH1 and RMV_TH2 may be two programmable parameters with default values 4 and 3, respectively.

Note that in the process to decide whether to set a motion vector to 0, only the original motion vectors in the neighborhood motion vectors may used, not the processed motion vectors.

The reason for the above motion vector processing may be that if all of the three conditions are satisfied, then the block A is very likely located in a stationary area. Note that the motion vector processing method may also be used in video encoding to achieve some coding gain.

Referring to FIG. 5, a listing of a set or rules is shown. After the above motion vector processing, the select S may be determined according to the rules illustrated in FIG. 5. In the above, ZMV_TH and ZMV_NC may be two programmable parameters with default value 4 and 0, respectively.

A picture level (either frame or field) stationary check may be preferred, in which case a block level stationary detect is generally used only to detect stationary blocks in a not-purely-stationary picture. Such a picture level stationary check may be available through an inverse telecine module (not shown).

The result of stationary check may be used for mode decision, as described in the following. The select Sy for luma in FIG. 3 is generally determined by the following. Let SAD(A) be the ME score of the block A in the field Fn. Let abserr(A in Fn, A in Fn−4) be a sum of absolute differences value between the block A and a co-located block in the field Fn−4. Then Sy=0 if both S=0 and abserr (A in Fn, A in Fn−4)≦SAD(A), otherwise Sy=1. The condition abserr(A in Fn, A in Fn−4)≦SAD(A) may be a strong indication that the block has cross-luma noise. The select Sc for luma in FIG. 2 is generally always set equal to S.

The function adapfrate generally performs temporal filtering on chrominance. The function adapfrate may be used only when PIC_MODE is not VF_Chroma_Only. The function adapfrate may be implemented as a VDSP instruction, and generally performs one of the following two tasks depending on the select Sc:

If Sc=0, then CURᴛ=adapfrate (CUR, P, PP, OFFSET, T1, T2)

If Sc=1, then CURᴛ=adapfrate (CUR, MC(Psᴛ), OFFSET, T1, T2)

The select Sc set to a zero generally implies that either PIC_MODE is Still_Picture or the current item may be located in a stationary area. In general, the function adapfrate blends CUR with P using the blending factor (filter strength) STR calculated from CUR, PP, OFFSET, T1 and T2. The present invention may differ from conventional MCTF techniques in that there may be three input fields (e.g., Fn, Fn−2 and Fn−4) and all three of the input fields may be original (e.g., not compensated or filtered in some way). In contrast, conventional MCTF uses only two fields (i.e., Fn and the filtered Fn−2) to filter the current field Fn. Furthermore, blending CUR with P per the present invention not only reduces cross-chroma noise, but may also reduce random noise as well.

Where Sc is 1 generally implies that either PIC_MODE may be Moving_Picture, or PIC_MODE may be MCTF_Only, or the current item may belong to a moving object. The function adapfrate generally blends CUR with MC(Psᴛ) with the blending factor STR calculated from CUR, MC(Psᴛ), OFFSET, T1 and T2. For moving objects, the function adapfrate generally blending CUR with MC(Psᴛ) to reduce both random noise and cross-chroma noise.

Referring again to FIG. 3, let SAD(A) generally be an ME score of the block A. Let ACT(A) generally be an intra activity of A. Let SAD(Auv) generally be a sum of absolute prediction residues for the two chrominance blocks of A. Note that SAD(Auv) may not be available from motion estimation but may be calculated using the VDSP function (instruction) abserr. Furthermore, an available and reasonable SAD(Auv) may be calculated from the two chrominance blocks of A and the two chrominance blocks of B (or C, depending on the position of A, (e.g., SAD(Auv)=SAD(Au)+SAD(Bu)+SAD(Av)+SAD(Bv) or with Bu and Bv replaced by Cu and Cv, respectively). If the color component format is 4:2:2, SAD (Auv) may be right-shifted by one. Similar notations and operations generally apply to the blocks B, C, D, and E. Further details may be found in the document "E5 MCTF Design Document" version 2.1, by A, Liu, September 2000, Milpitas, Calif. which is hereby incorporated by reference in its entirety.

Referring to FIG. 6, a listing of example code for calculating T1, T2, and OFFSET is shown. The following explanations are provided for the example code. C_StrFlt may be a programmable parameter taking integer values from approximately 1 to approximately 32 and with default value 16. Bias_Toward_Strong_Flt may be a programmable parameter in the range of approximately −128 to approximately +128, with default value 0. The conditions SAD(Zuv)>(C_StrFlt/8)* SAD(Z) and SAD(A)≦ACT(A)/4+Bias_Toward_Strong_ Flt together generally implies a good motion match and a high possibility of the existence of cross-chroma noise, in which case strong filtering is preferred. Bias_Toward_Blend may be a programmable parameter with default value 128. Pixel_Threshold_HP may be a programmable threshold on motion vector difference with default value 3 half-pel. BLOCK_SIMILARITY_THRESHOLD may be a programmable threshold on the number of consistent-motion neighbors with default value 3. Adaptive_Offset_0, Adaptive_Offset_1 and Adaptive_Offset_2 may be programmable adaptive offsets with default values 0.2, 0.3 and 0.4 (or 51, 77 and 102 if normalized over 256), respectively. Adaptive_Offset_3, Adaptive_Offset_4, and Adaptive_Offset_5 may be programmable adaptive offsets with default values 0.53, 0.56, and 0.75 (or 136, 144, and 192 if normalized over 256), respectively.

In the above, the six parameters (e.g., Adaptive_Offset_0, Adaptive_Offset_1, Adaptive_Offset_2, Bias_Toward_Blend, Pixel_Threshold_HP, and BLOCK_SIMILARITY_THRESHOLD) are used in a conventional MCTF technique and have the same meanings as in the present invention. The other five parameters (e.g., C_StrFlt, Bias_Toward_Strong_Flt, Adaptive_Offset_3, Adaptive_Offset_4, and Adaptive_Offset_5) are not used in the conventional MCTF technique.

The lowpass filter circuit 108 is generally used if PIC_MODE is not MCTF_Only. The lowpass filter circuit 108 may be applied to chrominance with the purpose of further reducing cross-chroma artifacts. The lowpass filter circuit 108 may be implemented by the VDSP instruction (function) linfilts, and generally performs the following operation (or equivalents):

$$CUR_{ST}=VF\_STR*CUR_T(-1)+(1-2*VF\_STR)*CUR_T(0)+VF\_STR*CUR_T(+1)$$

where $CUR_T(0)$ may be the output of the function adapfrate for the current pixel CUR, and $CUR_T(-1)$ and $CUR_T(+1)$ may be the outputs of the function adapfrate for the pixels above and below CUR in the field Fn, respectively. VF_STR is generally a programmable vertical filtering strength within a range of approximately (0, 0.5) and with a default value of 0.25. To properly deal with still pictures, the vertical filtering may be turned off for stationary areas with strong evidence.

For example, VF_STR may be set to 0 if all the following three conditions are satisfied for the block A: (1) s=0; (2) SAD(Auv)≦SAD(A); and (3) SAD(A)≦ACT(A)/4+Bias_Toward_Strong_Flt. The conditions (1) and (3) may actually be evaluated in determining T1, T2, and OFFSET.

The function adapfrate generally performs temporal filtering on luminance. The function adapfrate may be used only when PIC_MODE is not VF_Chroma_Only. Depending on the select Sy, the functional adapfrate generally performs one of the following two tasks for luminance filtering:

If Sy=0, then $CUR_T$=adapfrate (CUR, P, PP, OFFSET, T1, T2)

If Sy=1, then $CUR_T$=adapfrate (CUR, MC($P_T$), MC($P_T$), OFFSET, T1, T2)

In both the cases, CUR is generally blended with either P or MC($P_{ST}$), depending on Sy. In the case of Sy=1, the blending factor is generally determined from CUR and MC($P_{ST}$). In the case of Sy=0, the blending factor is generally calculated from CUR and PP, because Sy=0 may imply that the current item is located in a stationary area and there is a possibility of the existence of cross-luma noise.

Referring to FIG. 7, a listing of example code for calculating T1, T2 and OFFSET is shown. Referring to FIG. 8, a listing of example programmable parameters is shown In the case of Sy=0, abserr(A in Fn, A in Fn−4) may be used in the calculation of OFFSET, instead of SAD(A). In the existence of cross-luma artifacts, SAD(A) may be quite large even for stationary areas and thus may lead to a very large offset. Furthermore, OFFSET may be set to 0.5 so that a balanced blending between CUR and P is likely to occur. The parameters from PIC_MODE and below to VF_STR may be new parameters not used in conventional MCTF techniques.

Simulations were conducted for nine sequences, "MovingZonePlate", "MovingTower", "Sweater", "Gladiator", "MobileCalendar", "ColorBar1", "ColorBar2", "MovingzonePlate", "Pants", and "Reddetail". Among the sequences, "Gladiator", "MovingZonePlate", "MovingTower" and "Sweater" mainly contain cross-chroma artifacts; "ColorBar1", and "ColorBar2" mainly contain cross-luma artifacts; "Pants" contains both cross-luma artifacts and random noise; "MobileCalendar" contains detailed, sharp chrominance and does not contain noticeable composite noise or random noise. The intention of having "MobileCalendar" is to test how the present invention performs in preserving chrominance details. "Reddetail" is a still picture with a lot of chroma details.

In the simulations, the following settings are used:

| | |
|---|---|
| ME2_Search_Range_X | 4 |
| ME2_Search_Range_Y | 2 |
| ME3_Search_Range_X | 3 |
| ME3_Search_Range_Y | 3 |
| ME2_Zero_Bias | 16 |
| ME3_Zero_Bias | 16 |
| Zero_Bias | 1024 |
| Pixel_Threshold_HP | 3 |
| BLOCK_SIMILARITY_THRESHOLD | 3 |
| Adaptive_Offset_0 | 51 |
| Adaptive_Offset_1 | 77 |
| Adaptive_Offset_2 | 102 |
| Bias_Towards_Blend | 128 |
| Pic_mode | Block_Level_Stationary_Check |
| Bias_Toward_Strong_Flt | 0 |
| C_StrFlt | 16 |
| Adaptive_Offset_3 | 136 |
| Adaptive_Offset_4 | 144 |
| Adaptive_Offset_5 | 192 |

-continued

| | |
|---|---|
| ZMV_NC | 4 |
| ZMV_TH | 0 |
| RMV_TH1 | 4 |
| RMV_TH2 | 3 |
| VF_STR | 0.25 |

All the simulation sequences were generally in 4:2:0 format. All of the sequences, except "Reddetail", were of size 720×480. The "Reddetail" sequence may be of size 640×480. The following conclusions may be drawn by comparing the original sequences and the processed sequences: Cross-chroma artifacts on stationary objects may almost be completely removed. Cross-chroma artifacts on moving objects may be greatly reduced compared with conventional techniques. Chrominance detail loss caused by the present invention is generally not noticeable. Cross-luma artifacts may be dramatically reduced compared with conventional techniques. Random noise may be greatly reduced compared with conventional techniques. No visible detail loss may be observed for still pictures.

Motion compensation temporal filtering (MCTF) processes (or methods) suitable for the present invention may include (i) unidirectional motion estimation, (ii) bidirectional filtering and (iii) 422-chroma-format. Several methods are generally described below.

Method A: For an input field, the output may be the average of the current field with one of the following four: current field, previous field, next field, the mean of the previous field and the next field. The output is generally chosen to be whichever of the four averages has the lowest activity (with some bias towards using the current and away from using the mean of the previous field and the next field).

Referring to FIG. 9, a listing of an example code for the method A is shown. The method A generally has the following changes from a conventional MCTF technique. The filtering portion (e.g., adapfrate VDSP instruction) of the method A MCTF is generally not performed on the chroma; instead the steps shown in FIG. 9 may be done on each block.

Method B: The behaviors of adapfrate in MCTF may be modified as follows: (1) The blending for filtering is generally limited to always contain at least 50% of CUR, since allowing 100% of the prediction (as in conventional MCTF) may replace instead eliminating composite artifacts. The blending may be achieved by setting the programmable offset in adapfrate to approximately 0.5. (2) In calculating the blending factor in MCTF, a 3-pixel error may be computed from PrevMc and NextMc, instead of from PrevMcFilt and CUR. The composite artifacts generally reverse polarities on every NTSC frame and thus the error calculated from two NTSC frames apart (e.g., four PAL frames apart) may correctly identify areas where strong filtering is acceptable (e.g., the MC is good). (3) bidirectional mode may be used so that both PrevMc and NextMc are available, but two filtering passes may not be used. Generally, filtering is only performed on a 'backward' pass of the process, but CUR may be blended with (PrevMcOrig+NextMcorig+1)/2. (4) (only necessary for non-stationary artifacts): the error may be divided from at least 2, due to the increased temporal distance between samples, up to divide by 16. (5) a number of neighboring blocks with MVs within +/−1.5 pels of the MV of the current block is generally reduced from 3 to 2.

Referring to FIG. 10, a flow diagram of an example implementation for a method 150 is shown. The method 150 may be a method C. The method C generally comprises a step (or module) 152, a step (or module) 154, a step (or module) 156 and a step (or module) 158. The step 152 may be operational to perform a references select and field-level filtering mode decision. The step 154 may be operational to perform a motion estimation and compensation. The step 156 may be operational to perform a block-level filtering mode decision. The step 156 may perform the actual filtering.

In the first step 152, a forward reference and a backward reference may be selected for the field to be processed. The references are generally not limited to the two immediate neighboring pictures of the current field, but rather, may be identified in such a way that composite artifacts may be effectively reduced.

In the second step 154, motion estimation may be performed between the current field and the references selected in the first step 152. A compensated field is generally constructed from each reference field.

In the third step 156, a filtering mode may be determined for each block in the current field, based on field-level filtering mode from the first step 152, motion estimation results of the current block and neighbors from the second step 154, intra-activity of the block itself, and the intra-activity of the filtered block. The criterion of the mode decision is generally how effective composite artifacts may be reduced. In the last step 158, each block in the current picture may be filtered with the motion compensated block(s), according to a block-level filtering mode.

Figure 11:
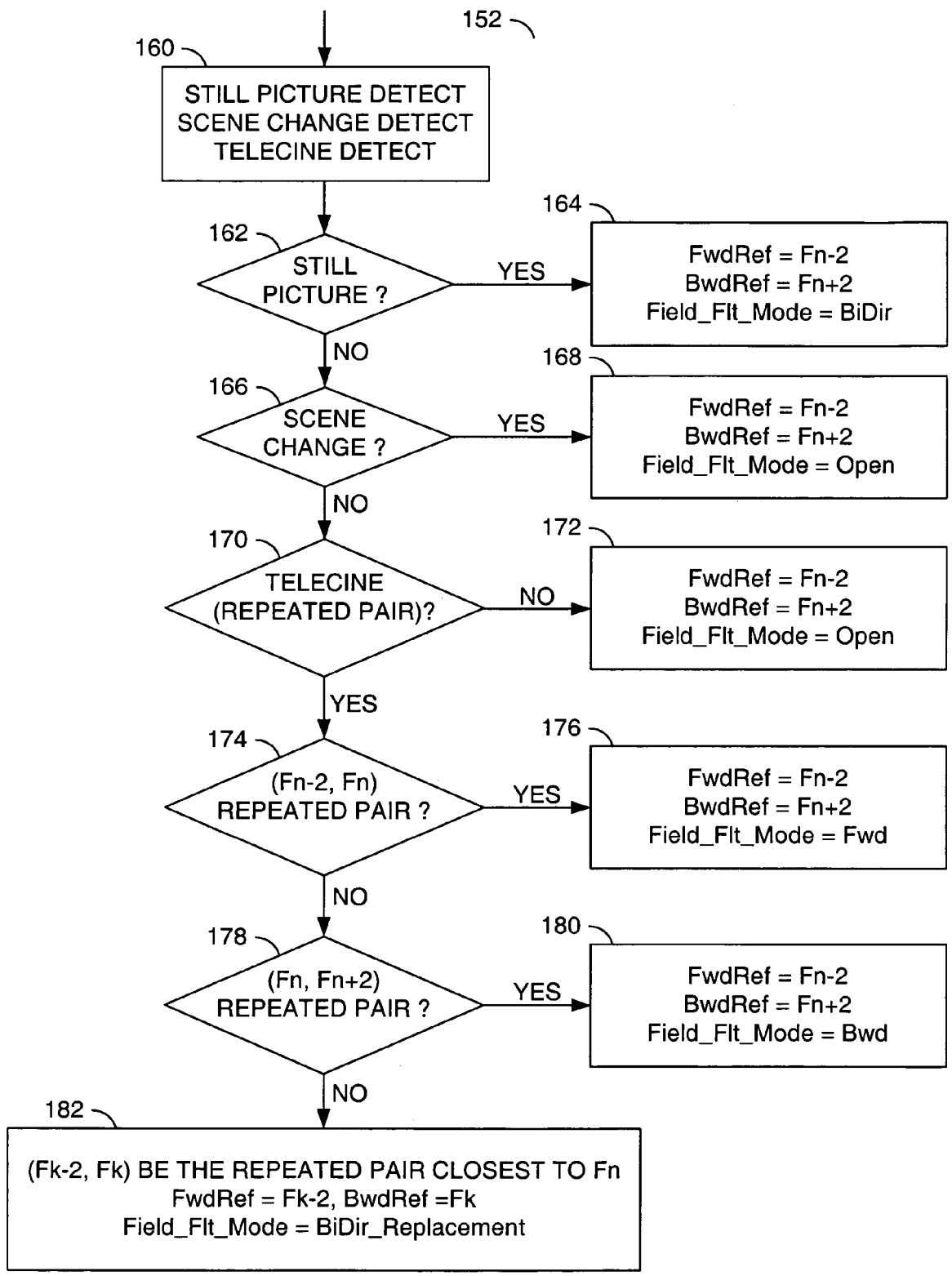
FIG. 11 is a detailed flow diagram of an example implementation for a reference select and mode decision step.

Referring to FIG. 11, a detailed flow diagram of an example implementation for the step 152 is shown. The step 152 generally comprises a step (or module) 160, a step (or module) 162, a step (or module) 164, a step (or module) 166, a step (or module) 168, a step (or module) 170, a step (or module) 172, a step (or module) 174, a step (or module) 176, a step (or module) 178, a step (or module) 180 and a step (or module) 182.

Let the current field to be filtered be the field Fn. To select a forward reference and a backward reference for field Fn, (i) a telecine detect, (ii) a scene change detect, and (iii) a still picture detect may be performed in the step 160. The telecine detect maybe done right after a field is captured. The telecine detect method may be based on 3:2 pull-down pattern. Further details of the telecine detect may be found in a document "A Robust Algorithm for Repeated-Field Detect", October 2003, by Y. Jia, L. Winger and E, Linzer, Milpitas, Calif., which is hereby incorporated by reference in its entirety.

A still picture detect may be checked in the step 162. If a still picture is detected (e.g., the YES branch), a forward reference field (e.g., FwdRef) may be set to the field Fn−2, ad backwards reference field (e.g., BwdRef) may be set to the field Fn+2 and a field filter mode (e.g., Field_Flt_Mode) may be set to bidirectional in the step 164.

The no still picture is detected (e.g., the NO branch). A scene change check may be performed in the step 168. If a scene change is detected (e.g., the YES branch), the step 168 may set the forward reference to the field Fn−2, the backward reference to the field Fn+2 and the mode to open.

If no scene change is detected (e.g., the NO branch), at telecine check may be performed at the step 170. If no telecine repeated pair is detected (e.g., the NO branch), the step 172 may set the forward reference to the field Fn−2, the backward reference to the field Fn+2, and the mode to open.

If a telecine repeated field pair is detected (e.g., the YES branch), a potential position of the field Fn among the pair may be checked by the step 174. If the field Fn is the later of the field pair (e.g., the YES branch), the step 176 may set the forward reference to the field Fn−2, the backward reference to the field Fn+2, and the filter mode to forward.

If the field Fn is not the later field among the repeated pair, the step 178 may check if the field Fn is the earlier field among the repeated pair. If the field Fn is the earlier field (e.g., the YES branch), the step 180 may set the forward reference to the field Fn−2, the backward reference to the field Fn−2 and the filter mode to backward.

If the field Fn is neither of the repeated pair (e.g., the NO branch), the step 182 may identify a repeated pair (Fk−2, Fk) closest to the field Fn, set the forward reference to the field Fk−2, the backward reference to the field Fk, and the filter mode to bidirectional replacement.

The scene change detect (step 168) may be done together with telecine detect (step 170). The scene change detect method is generally based on the following rule: let m=max (SAD(Fn−3, Fn−1), SAD(Fn−4, Fn−2), SAD(Fn−5, Fn−3), SAD(Fn−6, Fn−4)). If SAD(Fn−2, Fn)>c1*m, a scene change may exist between Fn−2 and Fn, where c1 is a programmable parameter with default value 4.

The still picture detect may be done together with telecine detect and scene change detect. The still picture detect method may be based on the following rule: if SAD(Fk−2, Fk)<c2* Field_Height*Field_Width for all k=n, n−1, ..., n−9, then Fn is a field in a still picture, where c2 is a programmable parameter with default value of 1.2. Other methods may be used for telecine detect, scene change detect, and still picture detect, to meet the criteria of a particular application.

Let FB be a buffer that holds a number of consecutive fields, including the current field Fn. The buffer FB should be large enough to ensure that the references for Fn at a ME circuit stage may be still kept in the buffer FB at the filtering stage for Fn. Note that the references for Fn may not be restricted to the two same-parity neighboring fields in the present invention, as may be seen from the following description. The forward reference and backward reference for Fn and field-level filtering mode are generally derived according to the rules generally illustrated in FIG. 12.

Referring again to FIG. 10, the motion estimation and compensation step 154 may include (i) a uni-directional motion estimation, (ii) a forward compensated field construction and (iii) a backward compensated field construction. Where the Field_Flt_Mode is BiDir_Replacement, the backward motion vectors may be set the same as the forward motion vectors In the block-level filtering mode decision step 156, for each block A in the current field, let B, C, D, and E be four immediate neighboring blocks on the row above and the row below, to the column left and the column right of the block A. Let Fwd_NC be a number of blocks Z in {B,C,D,E} such that:

|FwdMV$x$(Z)−FwdMV$x$(A)|<Pixel_Threshold

&& |FwdMV$y$(Z)−FwdMV$y$(A)|<Pixel_Threshold, where Pixel_Threshold is generally a programmable parameter with a default value of 3. All of the motion vectors may be in half-pel precision. Similarly, Bwd_NC may be defined as a number of blocks Z in {B,C,D,E} such that:

|BwdMV$x$(Z)−BwdMV$x$(A)|<Pixel_Threshold

&& |BwdMV$y$(Z)−BwdMV$y$(A)|<Pixel_Threshold.

The Ref_SAD may be the SAD value between the forward motion-compensated chroma block and the backward motion-compensated chroma block corresponding to A such that:

Ref_SAD=SAD(FwdMC_C(A)−BwdMC_C(A)).

The FwdSAD may be the score of forward ME for the block A, and BwdSAD may be that of backward ME. Both scores are generally normalized (e.g., right-shifted two bits and clamped to a maximum of 1023).

For any block Z, let IntraACT_Y(Z) be a normalized intra luma activity and IntraACT_C(Z) be a normalized intra chroma activity. Details for how to compute the activity may be found in the document "E5 MCTF Design Document" by Liu. The filtering mode for the current block A is generally derived according to the rules illustrated in FIG. 13. According to Block_Flt_Mode, the current block A may be filtered as show in FIG. 14.

The function performed by the flow diagrams and listings of FIGS. 1 and 5-14 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMS, EEPROMS, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. A method for composite noise filtering, comprising the steps of:
   (A) generating a selection value using a circuit in response to a stationary check identifying one of a plurality of blendings for a current item of a current field of an input signal generated as composite video;
   (B) generating a filtered item in response to one of (i) a first of said blendings between said current item and a first previous item co-located in a first previous field having an opposite phase of composite artifacts from said current field and (ii) a second of said blendings between said current item and a first motion compensated item from said first previous field;
   (C) switching between said first blending and said second blending in response to said selection value; and
   (D) generating an output signal having said current field with said current item replaced by said filtered item, wherein (i) said stationary check comprises the step of generating said selection value in response to a motion field analysis in a local neighborhood of said current item, (ii) said motion field analysis comprises the steps of (a) comparing at least one motion vector proximate said current item with a plurality of predetermined signatures, (b) determining if a first total number of said motion vectors matching said predetermined signatures is greater than a first threshold and (c) for each respective one of said predetermined signatures, determining if a second total number of said motion vectors matching said respective one predetermined signature is less than a second threshold and (iii) at least two of said second thresholds are different.

2. The method according to claim 1, wherein said current item is one of a current pixel and a current block.

3. The method according to claim 1, further comprising the step of:
generating a blending strength value used in said blendings in response to a blending factor calculation based on said current item and one of (i) a second previous item co-located in a second previous field having a same phase of composite artifacts as said current field and (ii) a second motion compensated item from said second field.

4. The method according to claim 3, further comprising the step of:
controlling said blendings in response to at least one statistic of said current item.

5. The method according to claim 4, further comprising the step of:
generating an offset value, a first threshold value and a second threshold value based on said statistic, wherein said blending strength value is further based on said offset value, said first threshold value and said second threshold value.

6. The method according to claim 4, wherein said at least one statistic comprises a plurality of said statistics including (i) a sum-of-absolute differences between said current item and said first previous item, (ii) a sum-of-absolute differences between said current item and said first motion compensated item, (iii) a variance in said current field, (iv) an offset of an adaptive frame rate function and (v) a plurality of thresholds of said adaptive frame rate function.

7. The method according to claim 3, wherein said second previous field is a fourth previous field from said current field.

8. The method according to claim 1, wherein said predetermined signatures comprise (i) a no motion signature, (ii) a one integer-pel vertical-only motion signature, (iii) a three integer-pel vertical-only motion signature, (iv) a five integer-pel vertical-only motion signature and (v) a seven integer-pel vertical-only motion signature.

9. The method according to claim 1, wherein said stationary check is based on detecting a still picture.

10. The method according to claim 1, wherein said stationary check is based on detecting a scene change.

11. The method according to claim 1, further comprising the step of:
spatially filtering said filtered item.

12. A circuit comprising:
a check module configured to generate a selection value in response to a stationary check identifying one of a plurality of blendings for a current item of a current field of an input signal generated as composite video; and
a filter module configured to (i) generate a filtered item in response to one of (a) a first of said blendings between said current item and a first previous item co-located in a first previous field having an opposite phase of composite artifacts from said current field and (b) a second of said blendings between said current item and a motion compensated item from said first previous field, (ii) switch between said first blending and said second blending in response to said selection value and (iii) generate an output signal having said current field with said current item replaced by said filtered item, wherein (i) said stationary check generates said selection value in response to a motion field analysis in a local neighborhood of said current item, (ii) said motion field analysis (a) compares at least one motion vector proximate said current item with a plurality of predetermined signatures, (b) determines if a first total number of said motion vectors matching said predetermined signatures is greater than a first threshold and (c) for each respective one of said predetermined signatures, determines if a second total number of said motion vectors matching said respective one predetermined signature is less than a second threshold and (iii) at least two of said second thresholds are different.

13. The circuit according to claim 12, wherein said current item is one of a current pixel and a current block.

14. The circuit according to claim 12, further comprising a motion estimation module configured to generate a motion vector used in determining said selection value.

15. The circuit according to claim 12, wherein said filter module comprises:
a blend module configured to generate said filtered item in response to a strength signal; and
a factor module configured to generate said strength signal in response to said current item and one of (i) a second previous item co-located in a second previous field having a same phase of composite artifacts as said current field and (ii) a second motion compensated item from said second field.

16. The circuit according to claim 15, wherein said filter module is further configured to control said blendings in response to at least one statistic of said current item.

17. The circuit according to claim 15, wherein said at least one statistic comprises a plurality of said statistics including (i) a sum-of-absolute differences between said current item and said first previous item, (ii) a sum-of-absolute differences between said current item and said first motion compensated item, (iii) a variance in said current field, (iv) an offset of an adaptive frame rate function and (v) a plurality of thresholds of said adaptive frame rate function.

18. The circuit according to claim 16, further comprising a statistics module configured to generate an offset value, a first threshold value and a second threshold value based on said statistic, wherein said strength signal is further generated in response to said offset value, said first threshold value and said second threshold value.

19. The circuit according to claim 12, further comprising a spatial filter configured to spatially filter said filtered item.

20. A circuit comprising:
means for checking configured to generate a selection value in response to a stationary check identifying one of a plurality of blendings for a current item of a current field of an input signal generated as composite video; and
means for filtering configured to (i) generate a filtered item in response to one of (a) a first of said blendings between said current item and a first previous item co-located in a first previous field having an opposite phase of composite artifacts from said current field and (b) a second of said blendings between said current item and a motion compensated item from said first previous field, (ii) switch between said first blending and said second blending in response to said selection value and (iii) generate an output signal having said current field with said current item replaced by said filtered item, wherein (i) said stationary check generates said selection value in response to a motion field analysis in a local neighborhood of said current item, (ii) said motion field analysis (a) compares at least one motion vector proximate said current item with a plurality of predetermined signatures, (b) determines if a first total number of said motion vectors matching said predetermined signatures is greater than a first threshold and (c) for each respective one of said predetermined signatures, determines if a second total number of said motion vectors matching said respective one predetermined signature is less than a second threshold and (iii) at least two of said second thresholds are different.

* * * * *